US011921326B2

(12) United States Patent
Dugan et al.

(10) Patent No.: US 11,921,326 B2
(45) Date of Patent: Mar. 5, 2024

(54) OPEN-AXIS OPTICAL ROTARY JOINT

(71) Applicant: Sanmina Corporation, San Jose, CA (US)

(72) Inventors: John Michael Dugan, Richardson, TX (US); Curtis Pastor, Allen, TX (US); Mark Alt, Garland, TX (US)

(73) Assignee: Sanmina Corporation, San Jose, CA (US)

(*) Notice: Subject to any disclaimer, the term of this patent is extended or adjusted under 35 U.S.C. 154(b) by 63 days.

(21) Appl. No.: 17/714,943

(22) Filed: Apr. 6, 2022

(65) Prior Publication Data

US 2022/0317382 A1  Oct. 6, 2022

Related U.S. Application Data

(60) Provisional application No. 63/171,471, filed on Apr. 6, 2021.

(51) Int. Cl.
*G02B 6/36* (2006.01)
*G02B 6/42* (2006.01)

(52) U.S. Cl.
CPC ......... *G02B 6/3604* (2013.01); *G02B 6/4206* (2013.01)

(58) Field of Classification Search
None
See application file for complete search history.

(56) References Cited

U.S. PATENT DOCUMENTS

| | | | |
|---|---|---|---|
| 4,027,945 A | 6/1977 | Iverson | |
| 4,444,459 A | 4/1984 | Woodwell | |
| 4,525,025 A | 6/1985 | Hohmann et al. | |
| 4,934,783 A | 6/1990 | Jacobson | |
| 5,336,897 A | 8/1994 | Watanabe et al. | |
| 5,991,478 A | 11/1999 | Lewis et al. | |
| 6,104,849 A | 8/2000 | Lewis et al. | |
| 6,453,088 B1 | 9/2002 | Lewis et al. | |
| 6,907,161 B2 | 6/2005 | Bowman | |
| 6,980,714 B2 | 12/2005 | Lo et al. | |
| 7,158,700 B2 | 1/2007 | Duncan et al. | |
| 8,611,753 B2 | 12/2013 | Lo et al. | |
| 9,170,378 B2 | 10/2015 | Bowman | |
| 9,207,406 B2 | 12/2015 | Bowman | |
| 9,927,579 B1 | 3/2018 | Zhang et al. | |
| 10,033,074 B2 | 7/2018 | Coleman | |
| 10,326,561 B2 | 6/2019 | Dudek et al. | |
| 2003/0107902 A1* | 6/2003 | Guy | G02B 6/0006 362/418 |
| 2003/0210859 A1* | 11/2003 | Mercey | G02B 6/3604 385/26 |
| 2009/0226131 A1* | 9/2009 | Zhang | G02B 6/3604 385/26 |
| 2010/0040379 A1* | 2/2010 | Kragl | G02B 6/3604 398/141 |

(Continued)

*Primary Examiner* — Jerry Rahll
(74) *Attorney, Agent, or Firm* — Daniel C. Mallery; LOZA & LOZA, LLP

(57) ABSTRACT

An optical rotary joint includes a first annular portion and a second annular portion configured to rotate with respect to each other. Optical receivers on a receiver face of the second annular portion receive from optical transmit beam launchers on an emitter face of the first annular portion. The transmit beam launchers transmit optical signals to the optical receivers as the second annular portion rotates with respect to the first annular portion.

19 Claims, 8 Drawing Sheets

(56) References Cited

U.S. PATENT DOCUMENTS

2013/0322889 A1* 12/2013 Graf .................. H04B 10/80
  398/141
2020/0247335 A1* 8/2020 Kondo .................. H04B 10/07
2022/0317382 A1* 10/2022 Dugan ................ G02B 6/3604

* cited by examiner

OPEN-AXIS OPTICAL ROTARY JOINT

CROSS REFERENCE TO RELATED APPLICATIONS

This application claims priority to and the benefit of U.S. Provisional Application No. 63/171,471 filed in the U.S. Patent and Trademark Office on Apr. 6, 2021, the entire contents of which are incorporated herein by reference as if fully set forth below in its entirety and for all applicable purposes.

FIELD

Various features relate to transmitting and receiving data from a rotating object to a stationary object, or from a stationary to a rotating object, and in particular to transmitting and receiving data through an optical rotary joint.

BACKGROUND

A large-diameter open-axis rotary joint is commonly used in industrial, robotic, and medical equipment. In an X-ray or Imaging scanner, the joint enables the rapid circumferential rotation of an X-ray source and associated detector array around an object. The rotation rate of the X-ray source and detector array can be as high as three revolutions per second. The circular opening through which the scanned object moves during the scan is roughly one meter in diameter. As the X-ray or Imaging equipment revolves around the opening, a large amount of data is generated. The data is transferred, as quickly as it is generated, to the stationary portion of the machine for storage and further processing. For an X-ray scanner, the data generation and transmission can reach data rates as high as a few gigabits per second (Gbps).

The high data rates, in combination with service life considerations, necessitate a non-contacting means of transferring the data. Both electrical and optical methods are used for non-contacting data transmission.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to an aspect, an optical rotary joint is provided comprising a first annular portion having a receiver face substantially orthogonal to a rotational axis of the rotary joint, and a second annular portion configured to rotate with respect to the first annular portion about the rotational axis, the second annular portion having an emitter face substantially orthogonal to the rotational axis and facing the receiver face. A plurality of optical receivers may be positioned, coupled, or configured on the receiver face facing the emitter face. A plurality of optical transmit beam launchers may be positioned, coupled, or configured on the emitter face configured to transmit optical signals to the optical receivers as the second annular portion rotates with respect to the first annular portion. The first annular portion may be a rotating portion and comprises a transmit data source, an optical splitter coupled to the transmit data source, and a plurality of optical fibers each coupled to one of the plurality of optical transmit beam launchers at one end and the optical splitter at an opposite end. The transmit data source, the optical splitter and the plurality of optical fibers may all be mounted to a supporting structure of the first annular portion. The optical splitter may comprise an optical device that splits the optical signal from the transmit data source into essentially identical replicas for each of the plurality of optical fibers. The plurality of optical fibers may be of nominally equal length. The transmit beam launchers comprises a collimator coupled to the respective optical fiber, wherein the collimator is directed to the receiver face. The optical receivers may comprise a photodetector and a lens configured to direct a received optical signal to the photodetector and wherein the lens is configured to provide no more than a predetermined time delay variation in optical path length for axial and paraxial optical signals. In one example, the predetermined time delay variation may be less than one picosecond. The optical rotary joint of claim 7 or 8, wherein the lens consists of a single aspheric element. The plurality of transmit beam launchers may transmit optical signals at two different wavelengths and wherein the optical receivers further comprise one of two different optical bandpass filters to pass a respective one of the two different wavelengths.

The optical rotary joint may further comprise a transmit data source for the optical signals at two different wavelengths, an optical splitter coupled to the transmit data source, and a plurality of optical fibers each coupled to one of the plurality of optical transmit beam launchers at one end and the optical splitter at an opposite end. The optical transmit beam launchers may be positioned equiangularly spaced around the emitter face. The optical receivers may be positioned on the receiver face with an angular separation of at least 3/2 times the angular separation of the optical transmit beam launchers. In one example, the optical receivers convert the optical signal each to respective electrical signal, the optical rotary joint further comprising a combiner coupled to the optical receivers to receive the electrical signals and add them together to form a single received electrical signal. The transmit beam launchers and the optical receiver are positioned on the emitter face and the receiver face, respectively, so that at least one of the plurality of optical receivers is always receiving an optical signal from at least one of the plurality of transmit beam launchers while the second annular portion rotates with respect to the first annular portion. The transmit beam launchers and the optical receiver are positioned on the emitter face and the receiver face, respectively, so that no optical receivers is receiving an optical signal from two different transmit beam launchers at the same time while the second annular portion rotates with respect to the first annular portion. In some examples, the transmit beam launchers and the optical receiver may be positioned on the emitter face and the receiver face, respectively, so that two different optical receivers receive a same optical signal from two different transmit beam launchers respectively at the same time while the second annular portion rotates with respect to the first annular portion. In one implementation, the transmit beam launchers may be positioned over only a portion of the emitter face such that no optical receiver is receiving an optical signal during a portion of the rotation of the second annular portion with respect to the first annular portion and wherein the transmit data source provides transmit data bursts only during the time that the optical signal will be received by an optical receiver. In some examples, the optical fibers are single mode fibers.

According to another aspect, an optical data transmission interface in a rotary joint is provided having a rotational axis comprising a first portion of the rotary joint, a plurality of transmit beam launchers positioned on the first portion and configured to transmit optical beams parallel to the rotation axis, a second portion of the rotary joint, and a plurality of optical receivers positioned on the second portion and configured to receive the optical beams from the transmit beam launchers. The first portion and the second portion may rotate with respect to each other. The plurality of transmit beam launchers may transmit the same optical beam and wherein the optical receivers are positioned to receive the optical beam from a different transmit beam launcher as the first portion and the second portion rotate with respect to each other.

According to yet another aspect, an apparatus is provided that comprises means for supporting a receiver face substantially orthogonal to a rotational axis of a rotary joint, means configured to rotate with respect to the receiver face means about the rotational axis for supporting an emitter face substantially orthogonal to the rotational axis and facing the receiver face, a plurality of means for receiving optical signals positioned on the receiver face facing the emitter face, and a plurality of means for transmitting optical signal positioned on the emitter face configured to transmit optical signals to the means for receiving as the means for supporting the emitter face rotates with respect to the means for supporting the receiver face.

According to yet another aspect, an optical rotary joint is provided comprising a rotor having a receiver face substantially orthogonal to a rotational axis of the rotary joint, a stator configured to rotate with respect to the rotor about the rotational axis, the stator having an emitter face substantially orthogonal to the rotational axis and facing the receiver face, a plurality of optical receivers on the receiver face facing the emitter face, and a plurality of optical transmit beam launchers on the emitter face configured to transmit optical signals to the optical receivers as the rotor rotates with respect to the stator.

According to yet another aspect, an optical rotary joint is provided comprising a stator having a receiver face substantially orthogonal to a rotational axis of the rotary joint, a rotor configured to rotate with respect to the stator about the rotational axis, the rotor having an emitter face substantially orthogonal to the rotational axis and facing the receiver face, a plurality of optical receivers on the receiver face facing the emitter face, and a plurality of optical transmit beam launchers on the emitter face configured to transmit optical signals to the optical receivers as the rotor rotates with respect to the stator.

According to yet another aspect, an optical rotary joint comprising a first annular portion having a first face substantially orthogonal to a rotational axis of the rotary joint, a second annular portion configured to rotate with respect to the first annular portion about the rotational axis, the second annular portion having a second face substantially orthogonal to the rotational axis and facing the first face, a plurality of optical receivers on the first face facing the second face, a plurality of optical receivers on the second face facing the first face, a plurality of optical transmit beam launchers on the first face configured to transmit optical signals to the optical receivers on the second face as the second annular portion rotates with respect to the first annular portion, and a plurality of optical transmit beam launchers on the second face configured to transmit optical signals to the optical receivers on the first face as the second annular portion rotates with respect to the first annular portion.

DETAILED DESCRIPTION OF THE INVENTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide a thorough understanding of the aspects described herein. It will be apparent, however, to one skilled in the art, that these and other aspects may be practiced without some or all of these specific details. In addition, well known steps in a method of a process may be omitted from flow diagrams presented herein in order not to obscure the aspects of the disclosure. Similarly, well known components in a device may be omitted from figures and descriptions thereof presented herein in order not to obscure the aspects of the disclosure.

In the following detailed description, numerous specific details are set forth in order to provide a thorough understanding of the different aspects. However, it will be understood by one of ordinary skill in the art that the different aspects may be practiced without these specific details. For example, well-known operations, structures, and techniques may not be shown in detail in order not to obscure the different aspects presented herein.

The illustrations presented herein are, in some instances, not actual views of any particular rotary joint, transmitter, receiver, electrical signal, or other specific components of an optical data transmission interface or rotary joint, but are merely idealized representations which are employed to describe the present disclosure. Additionally, elements common between figures may retain the same name but use different reference numbers.

Described embodiments enable transmission of multi-gigabit-per-second (Gbps) data signals across a rotating interface. The transmission is described as between a rotor and stator of a large-diameter optical rotary joint. Embodiments may be used with what is described as open-axis or off-axis operation, meaning that the data transmission components do not obstruct the rotational axis and central area of the rotary joint. Sensor and emitter technology improvements continue to provide higher image resolution and frame rates which, in turn, are better served by increased throughput data rates. Described embodiments overcome the insufficient signal power, waveform distortion, time-delay variation, or signal-level variation that can limit data throughput. Cost is further reduced by the small number of components, the large alignment tolerances, and the signal recovery methods.

Figure 1:
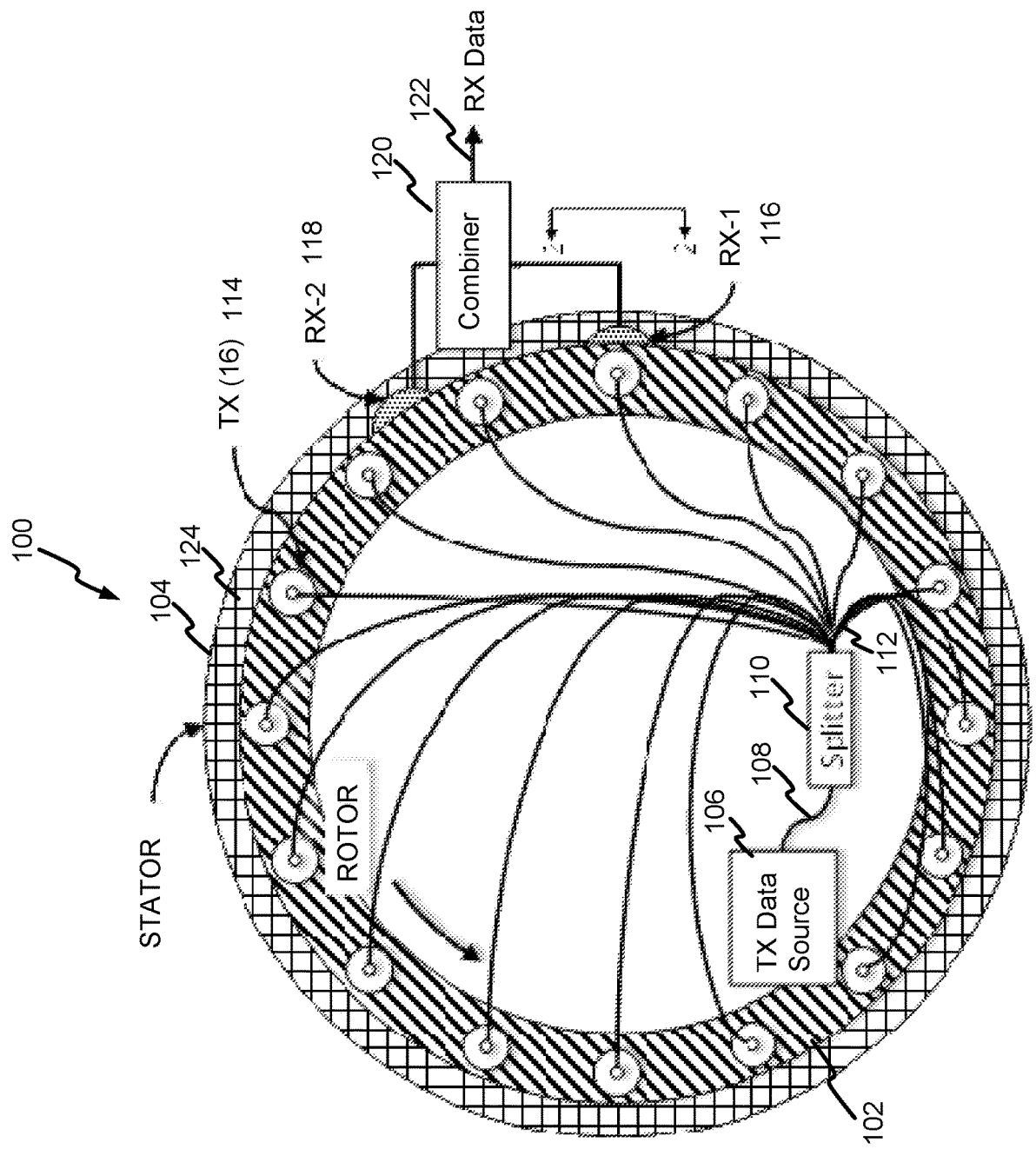
FIG. 1 is a plan view diagram of an optical rotary joint with a rotor and a stator in accordance with some embodiments.

FIG. 1 is a plan view diagram of an optical rotary joint 100 along an axis of rotation. The optical rotary joint includes a rotating portion, referred to herein as a rotor 102, and a stationary portion, referred to herein as a stator 104. The rotor 102 and the stator 104 are annular and have generally circular cross-sections as shown, but may include protuberances and fittings to the circular shape (not shown). The rotor 102 and stator 104 may be mounted to other fixtures and supporting equipment which is not shown in order to not obscure the invention. The rotor 102 is one of the two annular portions of the optical rotary joint and the stator 104 is the other of the two annular portions of the optical rotary joint.

In the illustrated configuration, an optical data transmission interface is provided between the two annular portions of the rotary joint. The rotating annular portion of the optical rotary joint includes a transmit (TX) data source 106, an optical splitter 110, sixteen transmit beam launchers 114, and various connecting optical fibers. A primary optical fiber 108 connects an optical signal from the transmit data source 106 to the optical splitter 110 and sixteen optical fibers 112 connect the split optical signal from the optical splitter 110 to each of the sixteen transmit beam launchers 114. The transmit data source 106 may include an optical amplifier (not shown) to overcome optical power losses created by the splitter. The sixteen optical fibers 112 are each coupled to one of the plurality of optical transmit beam launchers 114 at one end and to the optical splitter 110 at an opposite end. These components are all mounted to a supporting structure generally of the rotor 102. For clarity, the transmit data source 106, optical splitter 110, and optical fibers 108, 112 are shown occupying the central area of the optical rotary joint 100, but in practice those components are mounted in such a way that the central area remains unobstructed. The transmit beam launchers 114 are mounted to an emitter face of the rotor that is facing into the page away from the viewer. The emitter face is annular and in a plane that is substantially orthogonal to the rotational axis. As shown, the plane of the emitter face is parallel to the plane of the drawing sheet and the rotational axis extends orthogonal to the drawing sheet into the sheet.

In the illustrated configuration, the stationary annular portion 104 of the optical rotary joint 100 includes two optical receivers 116, 118 and a combiner 120, such as an electronic combiner circuit, electrically coupled to the two optical receivers 116, 118 all of which are mounted to a supporting structure of the stator 104. The optical receivers 116, 118 are not fully visible in the figure, due to being partially obscured by the rotor. The optical receivers 116, 118 are mounted to a receiver face 124 of the stator 104 which is annular and in a plane parallel to the drawing sheet and to the emitter face of the rotor. The emitter face and the receiver face 124 face each other so that the transmit beam launchers 114 direct an optical signal toward the two optical receivers 116, 118 parallel but offset from the rotational axis. The combiner 120 combines electrical signal from the optical receivers 116, 118 to generate a combined electrical data signal 122. The signal represents the signal from the transmit data source 106 after it has been sent through the optical data transmission interface of the optical rotary joint 100.

The number of transmit beam launchers and optical receivers may be greater or fewer than shown, depending on design objectives. Simultaneous bidirectional data transmission can be readily supported, and is not precluded despite the simplified example shown in the figure. The present description presents data flowing from the rotating portion to the stationary portion, however, the signal flow direction may be reversed, i.e., the signal may flow from the stationary portion to the rotating portion, merely by interchanging the location of the transmitter and receiver components. Embodiments of the optical rotary joint may be understood as having a first portion, which may be either the rotor 102 or the stator 104, having the transmit beam launchers 114 and supporting components and a second portion, which is the other of the rotor or the stator having the optical receivers 116, 118 and supporting components. There is relative motion between the first portion and the second portion as either or both or the first portion and the second portion rotate about the rotational axis of the rotary joint.

In operation, the transmit data source 106 generates an optical data stream that is delivered via an optical output port to the primary optical fiber 108. In some embodiments, all of the optical fibers are standard single-mode fibers, intended for operation in the wavelength range of 1250-1650 nm. Multi-mode fibers and/or other types of optical fibers are also possible and contemplated. The output port of the transmit data source 106 is connected by the primary optical fiber 108 to an input of a 1×16 optical splitter 110. The optical splitter 110 may be implemented as a low-cost, passive optical device that splits the signal into 16 essentially identical replicas, each of which carries about one-sixteenth of the original signal power. Alternatively, a more complex optical splitter with amplifiers and transducers may be used. While 16 replicas are generated, more or fewer may be used to suit different embodiments.

The 16 outputs from the optical splitter 110 are connected to 16 equiangularly located transmit beam launchers 114, via 16 nominally equal-length optical fibers 112. This arrangement delivers 16 identical optical signals with nearly identical signal timing, to be simultaneously launched from all 16 transmit beam launchers 114.

As the rotor 102 revolves around the central axis (counterclockwise in this example) of the optical rotary joint 100, the transmit beam launchers 114 travel past the optical receivers 116, 118. The optical beams are projected from each of the transmit beam launchers 114. In this embodiment, the optical beams propagate nominally parallel to the rotational axis of the rotary joint. Other propagation embodiments are possible. As the transmit beam launchers 114 revolve around the rotational axis, the optical beams are, from time to time, intercepted by the optical receivers 116, 118.

The diameter of the optical receivers 116, 118, the positioning of the optical receivers 116, 118, and the number of transmit beam launchers 114 are chosen to achieve certain design objectives. The geometry may be selected and the hardware may be configured to provide one or more of three or more useful features. First, at least one optical receiver is always receiving a signal from one of the transmit beam launchers. In other words, there is no time at which data from the data source is not being received at an optical receiver. Second, there is no time during which a particular optical receiver is receiving a signal from more than one transmit beam launcher at the same time. Third, during some time intervals both optical receivers are simultaneously receiving signals from two different transmit beam launchers. These time intervals are referred to herein as overlap intervals in that the data reception from both optical receivers overlap.

Figure 2:
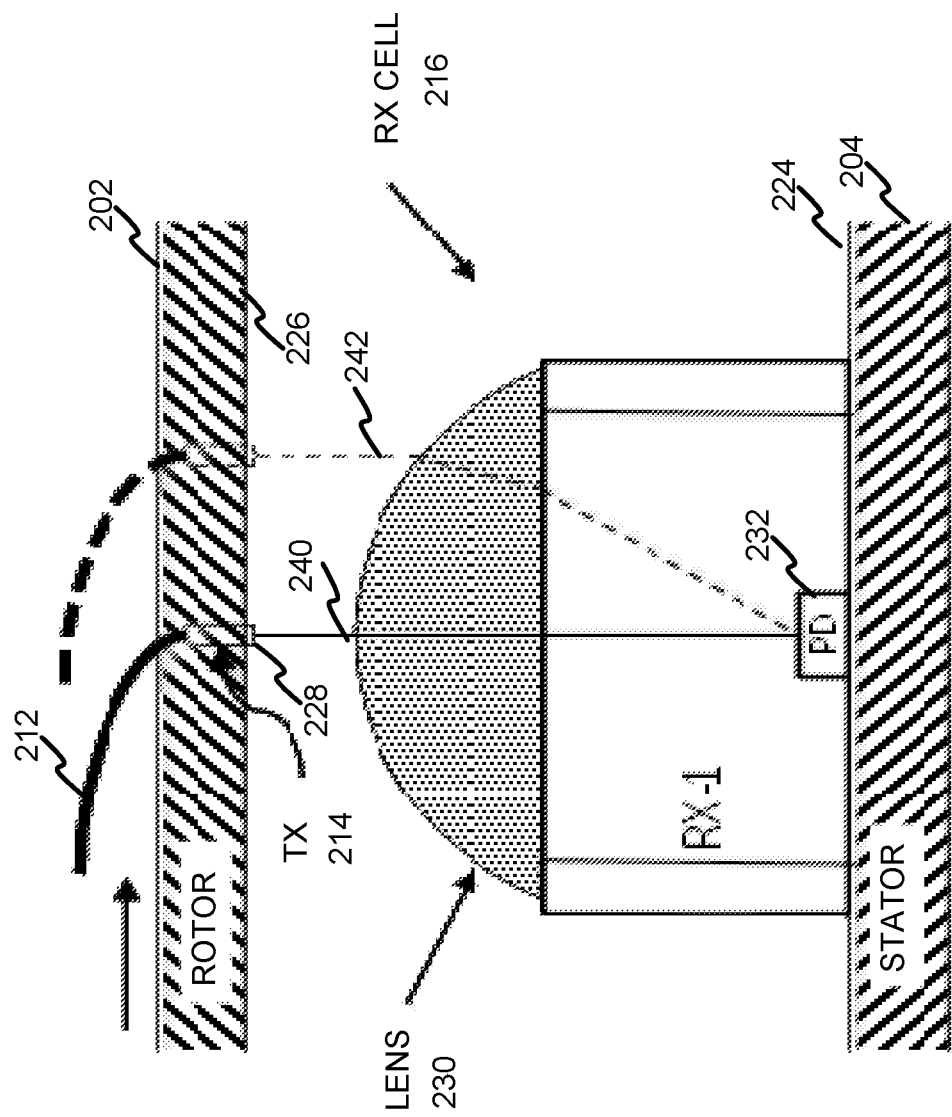
FIG. 2 is a cross-sectional side view diagram of a receiver cell and a transmit beam launcher with the rotor and stator in accordance with some embodiments.

FIG. 2 is a cross-sectional side view diagram of an optical receiver 216 and a transmit beam launcher 214 with the rotor 202 and stator 204 along with its associated optical fiber input 212. In the illustrated example, the beam from the transmit beam launcher 214 may be a diverging or collimated beam, however, only a central ray 240 and a paraxial ray 242 from the transmit beam launcher 214 are shown in the figure. The transmit beam launcher 214 may have a collimator 228 coupled to the optical fiber input 212 to direct the optical signal as represented here by a single ray 240, 242 toward the optical receiver 216. While a simple glass cylinder may be used, as shown, more complex collimation and focusing optical elements may be used instead or in addition. The optical signal may also be amplified or coupled to other signal or modulation signals.

The optical receiver 216 includes a lens 230, for example an aspheric lens aligned and affixed to a photodetector 232. The interior view of the optical receiver 216 is shown as an open space with the photodetector 232 at the focus point of the lens 230. In some embodiments, the lens 230 consists of a single aspheric lens element, as shown. Various examples of lens types may include aspheric lens, spherical lens, Fresnel lens, multisegment lens, etc. More elements and more complex elements may be used and the open space may be filed with transmissive material or a wavelength-selective material (e.g., wavelength filtering material). The configuration depicted in FIG. 2 is merely a simplified representation. Equivalent embodiments may include commonly used optical design features, such as a folded optical path, lenses with unnecessary portions removed, and so on.

As indicated by the solid lines of the central or axial ray 240 in the figure, when the transmit beam launcher 214 is centered over the center of the lens 230 and the photodetector 232 of the optical receiver 216, the optical signal from the transmit beam launcher 214 is in the form of an axial ray 240 that propagates as a ray parallel to the rotational axis of the optical rotary joint from the emitter face 226 of the rotor 202 to the lens 230 of the optical receiver 216 on the receiver face 224 of the stator 204. The axial ray 240 is directed axially straight through the lens 230 parallel to the rotation axis and impinges upon the surface of the photodetector 232. The optical signal of the axial ray 240 is then detected by the photodetector 232, and converted to an electrical signal. The electrical signal is provided to a combiner as discussed above.

As the rotor 202 revolves (in the cross-sectional view of FIG. 2, the rotor moves to the right) in the direction shown in the arrow, the transmit beam launcher 214 on the emitter face 226 of the rotor 202 moves with it. As the transmit beam launcher 214 moves, the optical signal from the transmit beam launcher 214 traverses an arc across the lens 230 defined by the width of the lens 230 from left to right as shown in the diagram. After crossing the optical axis of the optical receiver 216, the optical output signal impinges on the lens 230 at an increasingly off-center position on the lens 230 until the transmit beam launcher 214 is no longer over even the edge of the lens 230. The lens 230 is configured to focus off-center light from any impinging paraxial rays 242 to the same photodetector 232.

The second dashed line ray tracing shows a paraxial ray 242 with a large incident height, placing it near the edge of the lens 230. The paraxial optical signal beam shown as the paraxial ray 242 is refracted by the lens 230, such that the paraxial optical signal beam continues to be aligned to and impinge upon the photodetector 232. Thus, as long as the optical signal beam that is output by the transmit beam launcher 214 is within the effective diameter or effective width of the lens 230, the optical signal beam is delivered at full strength or nearly full strength to the photodetector 232 in the optical receiver 216. In some embodiments, the lens 230 is not circular, having a diameter but is elongated along the direction of rotation so that the lens is able to direct the optical signal beam across a longer chord of movement across the receiver face 224 of the stator 204.

The physical distance from the transmit beam launcher 214 to the photodetector 232 is shorter for the path of the centered axial ray 240, indicated in solid line, than it is for the path of the paraxial ray 242 indicated in dashed line. If the propagation speed of light were the same in both paths, then this would cause a time delay variation in the detected signal. Such a time delay could reduce the maximum throughput data rate between the transmit beam launcher 214 and the photodetector 232. However, in the configuration shown in FIG. 2, the propagation velocity in the lens 230 is slower than in air. Thus, the center ray 240, which has a shorter physical distance or travel path than the edge ray 242, takes the same amount of time as the edge ray 242 to reach the photodetector 232. Thus, in the preferred embodiment, despite the difference in physical path lengths, the total travel time is essentially identical for the two paths (e.g., for centered axial ray 240 and for paraxial ray 242) and for all other paraxial paths within the usable diameter of the lens 230. For instance, while the center axial ray 240 has a shorter physical distance than the paraxial ray 242, the center axial ray 240 has a longer propagation delay as it travels a greater distance through the lens 230 which slows its propagation velocity due to light traveling more slowly through the lens material than it does in air. As shown, the axial ray 240 travels a longer physical distance through the lens 230 than the paraxial ray 242, causing a greater delay for the axial ray 240. The time delay variation may be further affected by selecting appropriate materials for use between the lens 230 and the photodetector 232. In some embodiments, the time delay variation may be predetermined by the physical structure of the optical rotary joint 100. Using common fiber and photodetectors the time delay variation across the entire lens diameter may be kept to less than one picosecond, which corresponds to about 1% of a bit interval at 12.5 Gbps.

As was mentioned previously, at least one of the two optical receivers 116, 118 is always receiving the optical signal from one of the 16 transmit beam launchers 114. This optical signal is essentially the same from all of the transmit beam launchers 114 with no significant delay so that the transmit data stream is being continuously captured and reconstructed, without gaps. The continuous stream avoids any need for burst transmission data-handling techniques. However, the continuous stream requires more transmit beam launchers to maintain continuous coverage over an optical receiver. In an alternative embodiment, the transmit beam launchers are positioned only over a portion of the annular surface of the emitter face so that there is a portion of each rotation during which no optical receiver receives a signal from a transmit beam launcher. The transmit data source is configured to track the timing of the rotation and provide transmit data bursts only during the time that the optical signal will be received by an optical receiver. In some embodiments a portion of the annular surface may be used for one data channel and another portion of the annular surface may be used for another data channel.

Continuous data flow is improved using an overlap interval, during which both of the two optical receivers 116, 118 are simultaneously receiving the signal each from a different one of two of the 16 transmit beam launchers 114. The overlap interval takes place whenever one transmit beam launcher 114 is nearing the end of its capture zone at one optical receiver 116 while another transmit beam launcher 114 is just entering the beginning of its capture zone at the other optical receiver 118.

Another feature of the illustrated configuration, as previously mentioned, is that, at no time does any single optical receiver 116, 118 receive a signal from more than one transmit beam launcher 114 at the same time. If this were to happen then the two optical signal beams would interact in the optical path from the two transmit beam launchers 114 to the photodetector. The phase of the two signals is likely to be different or varying through this path. The variation may create constructive or destructive interference or a combination as the phase varies. The interference products may obscure the data signal. Using multiple transmit beam launchers 114 and two optical receivers 116, 118, even coherent interference is avoided.

Figure 3:
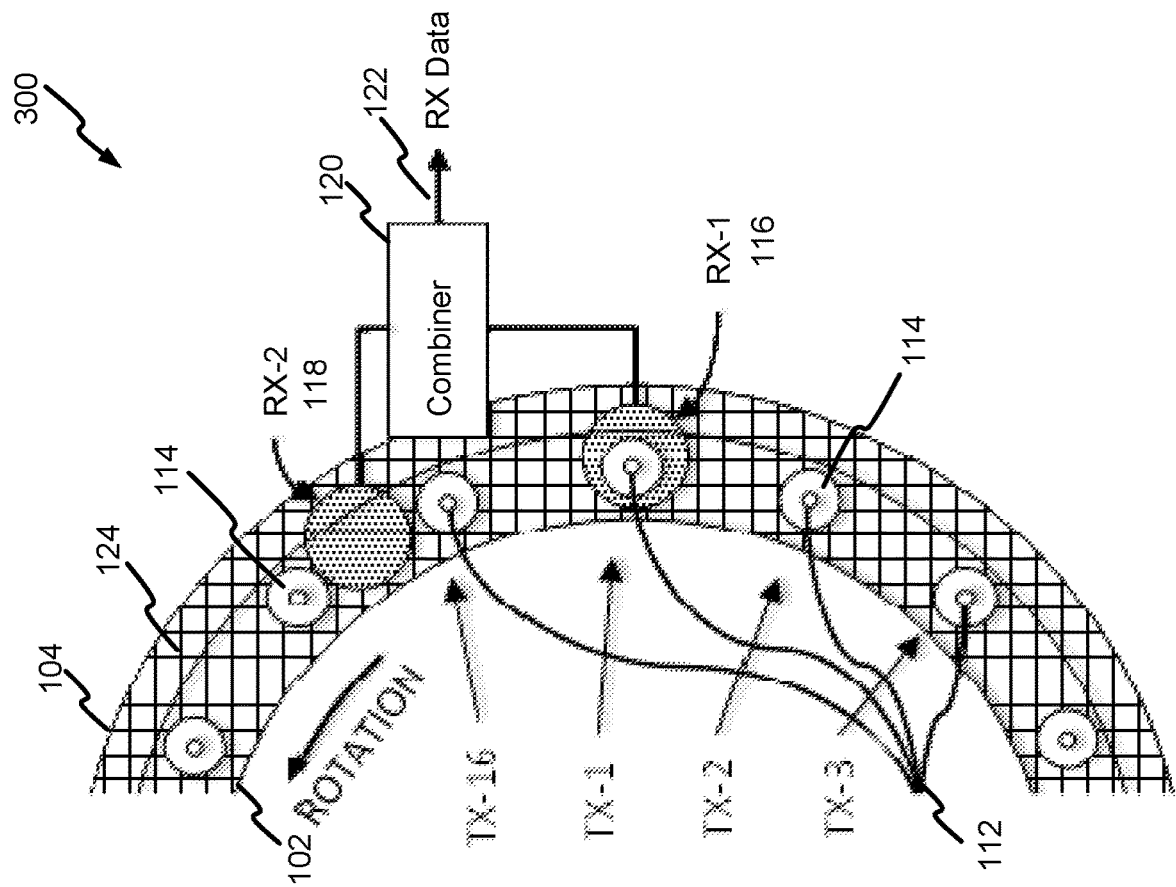
FIG. 3 is a plan view diagram of a portion of the optical rotary joint in which the rotor is rendered transparent to better show the receiver cells, in accordance with some embodiments.

FIG. 3 is a plan view diagram of a part 300 of the rotary joint. In this view, the rotor 102 is rendered transparent, which allows the positions of the optical receivers 116, 118 to be more clearly visible. In addition to the optical receivers 116, 118, four of the transmit beam launchers 114 are labeled, as TX-16, TX-1, TX-2, and TX-3, with TX-1 positioned at the moment depicted near the center of one of the optical receivers 116. As the rotor 102 revolves counterclockwise, the transmit beam launchers 114 sweep past the receiver cells 116, 118, illuminating each receiver cell 116, 118 in turn. Each transmit beam launcher 114 subtends an arc across each optical receiver 116, 118 in turn as the rotor 102 rotates.

The electrical output signals of the optical receivers 116, 118, are both connected to the combiner 120 which simply recombines the signals to generate a combined electrical data signal 122 as a single data stream over time. A more complex combining function may be used depending on the particular optical rotary joint configuration and intended use.

The angular separation of optical receivers 116, 118 may be determined based on the number of transmit beam launchers 114. Defining the separation angle α (in degrees) of N equiangularly spaced transmit beam launchers, α is given by:

$$\alpha = 360/N \quad \text{(Equation 1)}$$

The separation angle β of the centers of optical receivers 116, 118 may be set to:

$$\beta = \left(\frac{2n+1}{2}\right)\alpha \quad \text{(Equation 2)}$$

in which n is an integer greater than zero. This provides that β≥3/2α. For example, if N=16 and n=1, then:

$$\alpha = 22.5 \text{ degrees} \quad \text{(Equation 3)}$$

$$\beta = 33.75 \text{ degrees} \quad \text{(Equation 4)}$$

These angular separations are shown in the embodiments illustrated in FIG. 1 and FIG. 3. Note that while the angular separation is equiangular, it is not necessary that each equiangular position be occupied with a transmitter or a receiver. In some embodiments there are gaps around the annular face with no transmitter or receiver.

Figure 4:
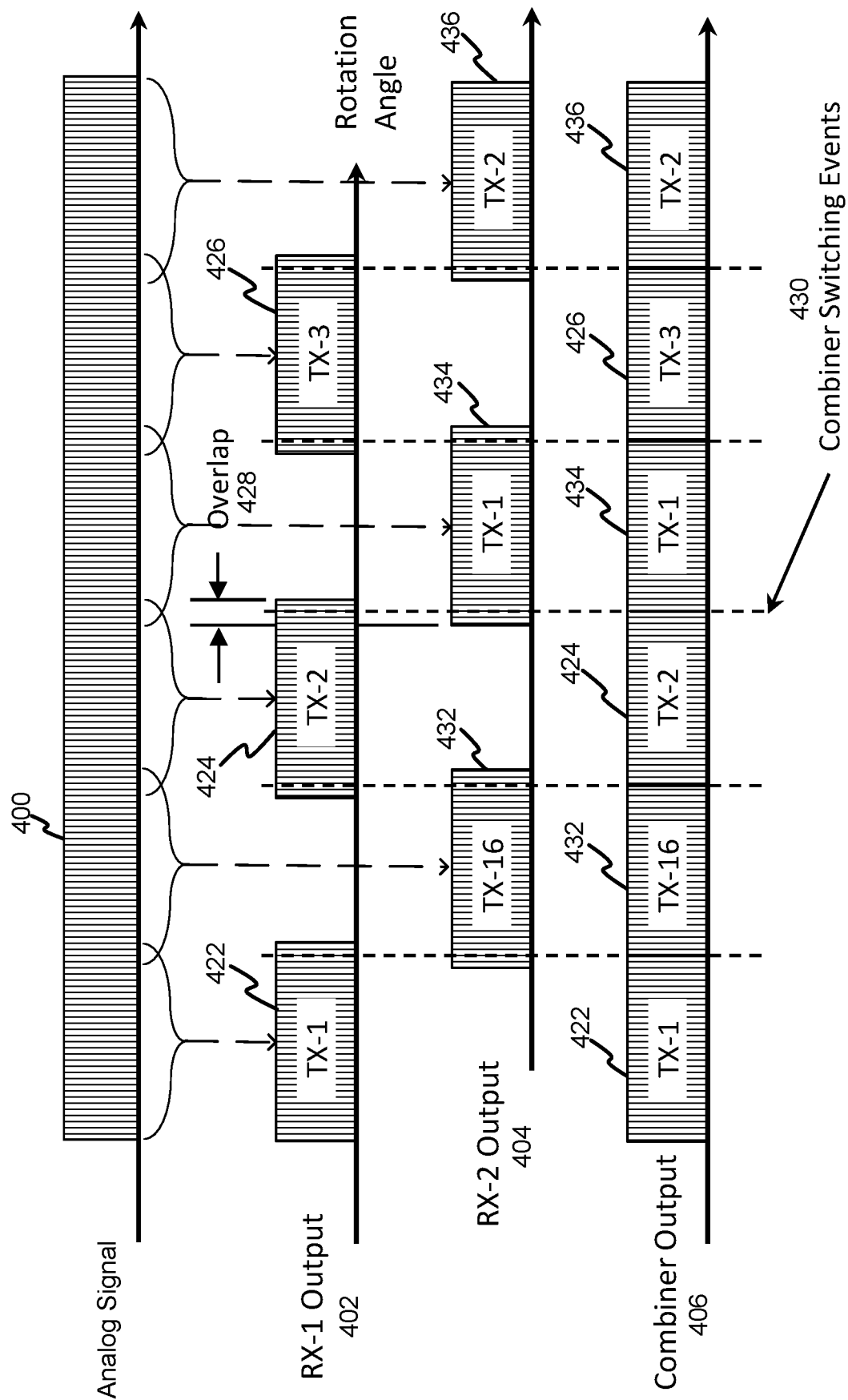
FIG. 4 is a signal diagram illustrating how an analog signal is transmitted by the transmitters through the receivers of the rotary joint of FIG. 3.

FIG. 4 is a signal diagram illustrating how an analog signal 400 is transmitted by the transmitters through the receivers of the rotary joint of FIG. 3. The analog signal 400 may be sent to all transmit beam launchers 114 (e.g., TX-16, TX-1, TX-2, TX-3, . . . ) which then transmit it to the optical receivers (RX-1) 116 and (RX-2) 118. The receiver output signals 402, 404 are aligned along an axis of time and rotor rotation angle showing an output from a first receiver cell (RX-1) 116, an output from a second receiver cell (RX-2) 118 and a combination of the two outputs. These two electrical output signals 402, 404 of the corresponding optical receivers 116, 118, are both connected to the combiner 120, the output of which is shown as the combiner output 406. Time is directly related to the rotation angle of the rotor and the output signals 402, 404 and merged combiner output 406 are shown as a function of rotation angle, with rotation angle increasing in the rightward direction.

The continuous analog signal 400 may be transmitted as segments received over the optical receivers 116 and 118. For instance, as transmit beam launcher TX-1 rotates, it delivers a first data burst (e.g., first signal segment) 422 to optical receiver RX-1 and a different data burst (e.g., different signal segment) 434 to optical receiver RX-2. This process repeats for all transmit beam launchers. Consequently, as shown, the output signals 402, 404 from the optical receivers 116, 118 are not continuous; instead, the outputs arrive as periodic bursts. The output signals 402, 404 become active when a transmit beam launcher 114 is aligned within the usable diameter of a receiver cell 116, 118 but are dormant otherwise.

The RX-1 output signal 402 indicates the electrical output from the photodetector of the first optical receiver 116 which is a first input to the combiner 120. Labels superimposed on the data bursts indicate which transmit beam launcher 114 (e.g., TX-1, TX-2, . . . ) is responsible for the data flow during that burst. For example, there is a data burst 422 from transmit beam launcher TX-1, then a gap, followed by a data burst 424 from transmit beam launcher TX-2, then another gap, then a data burst 426 from transmit beam launcher TX-3. This sequence follows from the counter-clockwise rotation of the rotor as shown in FIG. 3.

Similarly, the RX-2 output signal 404 indicates the electrical output from the photodetector of the second optical receiver 118 which is a second input to the combiner 120. Labels superimposed on the data bursts indicate which transmit beam launcher is responsible for the data flow during that burst. For example, there is a data burst 432 from transmit beam launcher TX-16, then a gap, followed by a data burst 434 from transmit beam launcher TX-1, then another gap, then a data burst 436 from transmit beam launcher TX-2. The sequence of data burst sources shown in the optical receiver RX-2 output diagram is also a logical consequence of the rotor motion.

As shown the output signals 402 and 404 are time aligned so that an overlap interval 428 between the optical receiver output signals 402, 404 is visible. During the overlap interval 428 both optical receivers have valid output data, each from a different transmit beam launcher. The signal transitions from one optical receiver to the other optical receiver to cause a transition interval. The geometry of the invention, which includes the diameter of the optical receivers, the positioning of the optical receivers, and the number of transmit beam launchers, is configured to ensure that the two receiver cell outputs overlap at least to some degree. While only one overlap interval 428 is indicated by reference number 428, the diagram indicates an overlap interval before and after each data burst.

The combiner output 406 is time-aligned and illustrates the combined output signals from the combiner 120. As shown, the data is continuous with no gaps. The overlap interval 428 is combined to a transition interval 430 during which the combiner output transitions from one data burst to another. The continuous data flow is generated in the combiner by combining the data bursts that are the electrical outputs from the two optical receivers 116, 118. These output signals 402, 404 are controlled by the optical signal produced by each transmit beam launcher 114. Using the optical splitter 110 and approximately equal lengths of connecting optical fiber 112, the two output signals 402, 404 of data bursts have substantially identical signal timing. As discussed previously, the time delay variation through an optical receiver 116, 118 of some embodiments is less than one picosecond. Further, currently manufactured parts achieve delays in the optical splitter-to-transmit beam launcher paths of less than 10 picoseconds. Taken together, it is practical for the outputs from a first optical receiver 116 and a second optical receiver 118 to be time-aligned within about 10 picoseconds, which corresponds to about 10% of a bit interval at 12.5 Gbps. With timing this precise, the outputs from the two receiver cells 116, 118 can be combined without further attention to timing alignment.

The combiner 120 may operate using any of a variety of suitable structures and techniques to take the combined data burst 406 (from the two signals 402, 404) and generate the combiner output 406 from the two inputs 402, 404. In some embodiments, a switch is performed between the two inputs using a 2:1 multiplexer. The switch may be made at any time during the transition interval which spans the overlap. In some embodiments, the two signals are combined by means of a logic OR gate. In some embodiments, the two signals are merged using analog techniques. Regardless of the combining approach, the final output is a continuous data stream, as shown in the combiner output 406 signal diagram of FIG. 4. The switching or merging may take place during the intervals labeled as transition interval 430.

The end result is a combiner output 406 in the form of a data stream that is a true replica of the original data stream 400 from the transmit data source 106. The output of the combiner can be an electrical waveform, as described, or can be converted back into an optical data stream via a low-cost, standardized electrical-to-optical converter, such as an SFP (Small Form Factor Pluggable) or XFP (10 Gbps SFP) transceiver. At no point in the transfer of data across the optical rotary joint is it necessary to recover clock or perform bit-wise manipulation of the data stream.

In the described embodiments, the combiner 120 does not require any information regarding the rotation rate, rotational position or any other information about the rotor, the stator, or the data in order to switch or merge the signal bursts. All necessary timing may be derived directly from the input signals by observing the signal levels detected at each receiver cell.

In an alternative configuration, the receiver cells 116, 118 may be made smaller, if desired, to reduce cost. This would enable the use of low-cost, high manufactured volume, molded aspheric condenser lenses. If the receiver cells are smaller, then number of transmit beam launchers 114 may be increased to maintain the continuous stream of data. For instance, if the number of transmit beam launchers were doubled to 32, a commonly available lens diameter of 75 mm would be more than adequate for receiver cells located on a nominal radius of 530 mm, for example.

Figure 5:
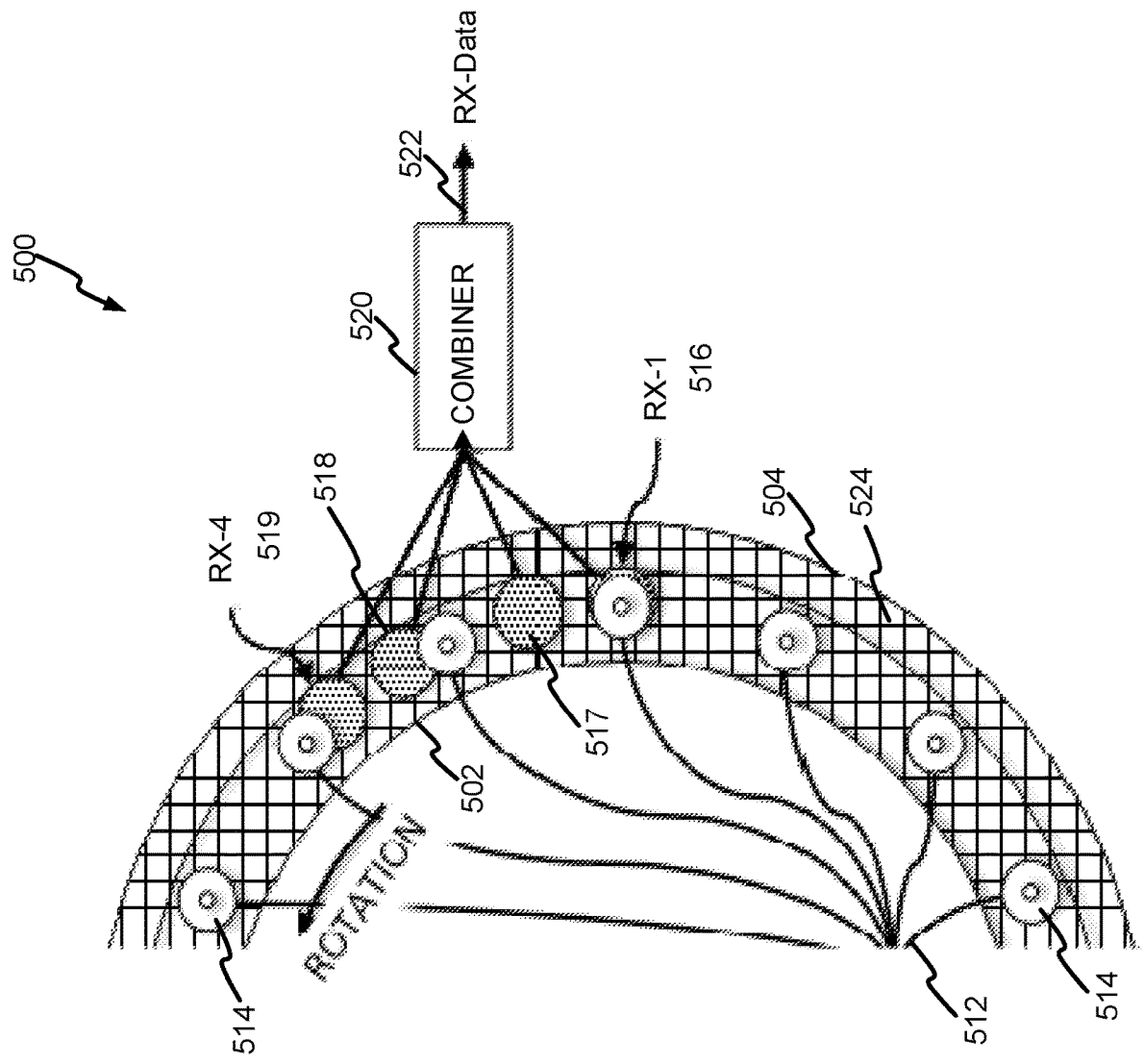
FIG. 5 is a plan view diagram of a portion of the optical rotary joint with four receiver cells in which the rotor is rendered transparent to better show the receiver cells, in accordance with some embodiments.

A second approach to accommodate reduced lens diameters is to increase the number of receiver cells. FIG. 5 is a plan view diagram of a part 500 of an alternative optical rotary joint with four receiver cells 516, 517, 518, 519 on a receiver face 524 of a rotor 504 instead of two. All four receiver cells 516, 517, 518, 519 are connected to a 4:1 combiner 520 that generates a combiner output 522. A rotor 502 has multiple transmit beam launchers 514 on an emitter face of the rotor 502. The transmit beam launchers are optically coupled to other optical source components (not shown) by a bundle of optical fibers 512.

Continuing with the previous terminology, for a quantity=N of transmit beam launchers separated by angle α, two "groups" of receiver cells with K cells in each group may be used. Within each group, the angular separation between adjacent cells is given by α/K Assuming the groups are adjacent, the separation angle β between the centers of the groups is given by:

$$\beta = \left(\frac{3}{2} - \frac{1}{2K}\right)\alpha \qquad \text{(Equation 5)}$$

For example, if N=16 and K=2, there would be two groups of two receiver cells, with angular separation of 11.25 degrees between the two cells of each group, and a separation of 28.125 degrees between the centers of the two groups. As shown in FIG. 5, the output of each one of the four receiver cells 516, 517, 518, 519 is connected electrically to the combiner 520. The combiner output 522 is a continuous stream that appears similar to the combiner output 406 shown in FIG. 4, except that each data burst is only half as long, as measured by time or change in rotational angle, as shown. Four overlapping outputs are merged together into the combiner output data stream. For this example, with this rotor 504 diameter, and this number of launchers 514, a commonly available lens diameter of 75 mm would be acceptable.

The described single wavelength optical data signal may be configured to provide a single, serial throughput data rate of up to 12.5 Gbps using commonly available optical transmitters, optical fibers, and photodetectors. The data rate may be enhanced to achieve much higher total data rates, by applying wavelength-division multiplexing (WDM) techniques. Some example modifications to achieve high channel-count WDM capability are described below.

Figure 6:
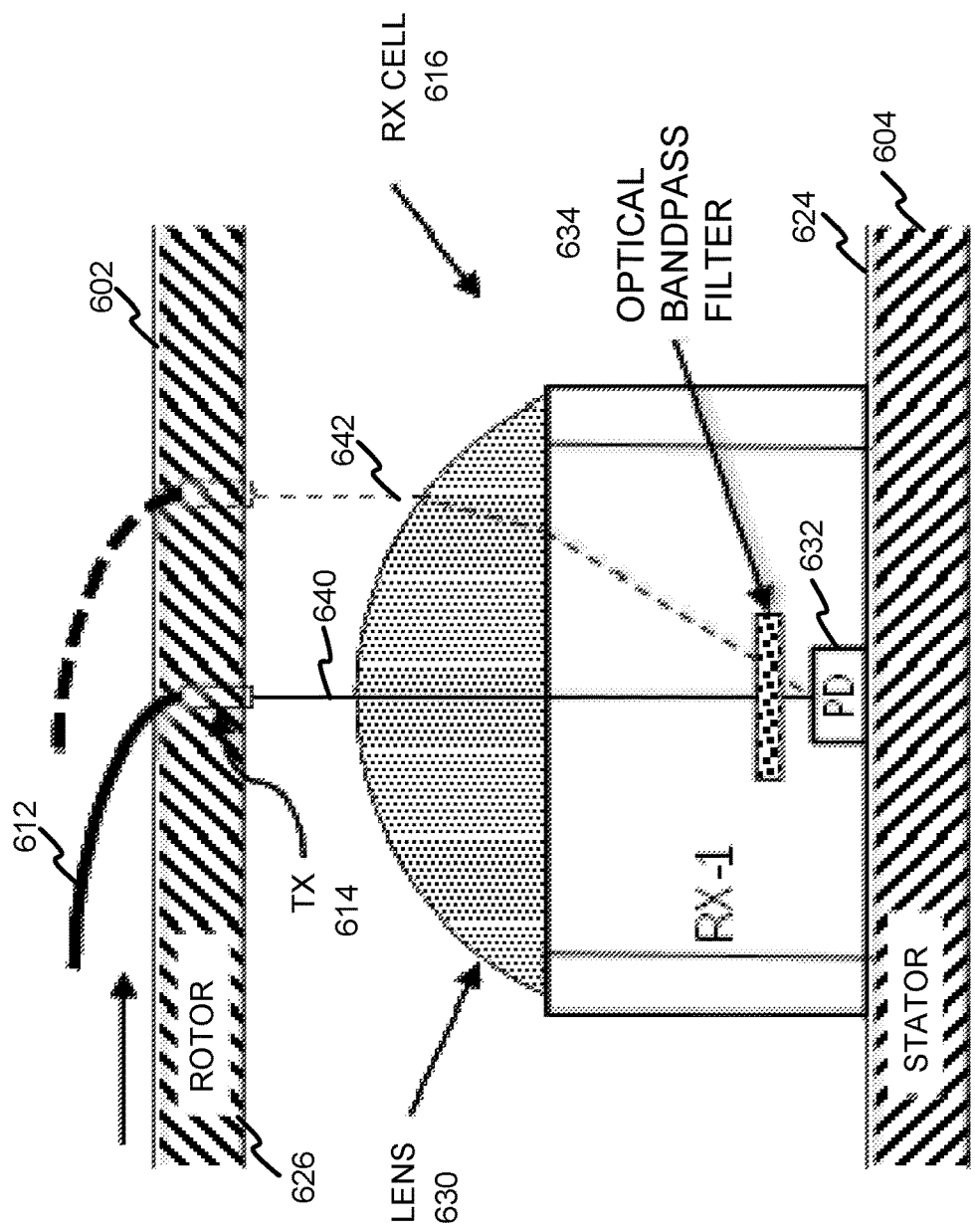
FIG. 6 is a cross-sectional side view diagram of a receiver cell with a bandpass filter for use with wavelength-division multiplexing and a transmit beam launcher with the rotor and stator in accordance with some embodiments.

One technique to support WDM is to modify the optical receivers. FIG. 6 is cross-sectional side view diagram of a modified receiver cell 616 with an optical bandpass filter 634 between an impinging axial 640 or paraxial 642 ray and a photodetector 632. A rotor 602 has a transmit beam launcher 614 on an emitter face 626 of the rotor 602 coupled to an optical fiber 612 from an optical transmit data source. The transmit beam launcher 614 directs a collimated axial ray 640 to a receiver cell 616 which has a lens 630, for example an aspheric lens to direct the axial ray 640 through the bandpass filter 634 to the photodetector 632. The lens 630 is configured to direct axial rays 640 and paraxial rays 642 to the same photodetector 632 as the emitter face moves with the rotor. The receiver cell 616 is positioned on a receiver face 624 of a stator 604 of the optical joint.

The optical bandpass filter 634 passes only a desired wavelength and filters out light other than that particular wavelength or wavelength band that has been selected for data communication. As shown, the optical bandpass filter 634 between the lens 630 and the photodetector 632 blocks wavelengths of other channels but not that of the desired channel. A commonly used filter that would be acceptable for this application is a thin-film filter designed for WDM channels on 200 GHz spacing. Such an optical bandpass filter would add less than 1 dB of loss to the optical path. Other optical receivers may be configured with different bandpass filters so that there are two or more optical receivers for each channel wavelength.

As was described previously, if 32 transmit beam launchers are used, a lens diameter of 75 mm is sufficient. In the assumed geometrical configuration, the transmit beam launchers and the receiver cells are located at a radius of 530 mm from the rotational axis. At least two optical receivers are used per channel, separated by an angle $\beta=16.875$ degrees. By interleaving receiver cells, up to 20 receiver pairs may be positioned around the ring.

Figure 7:
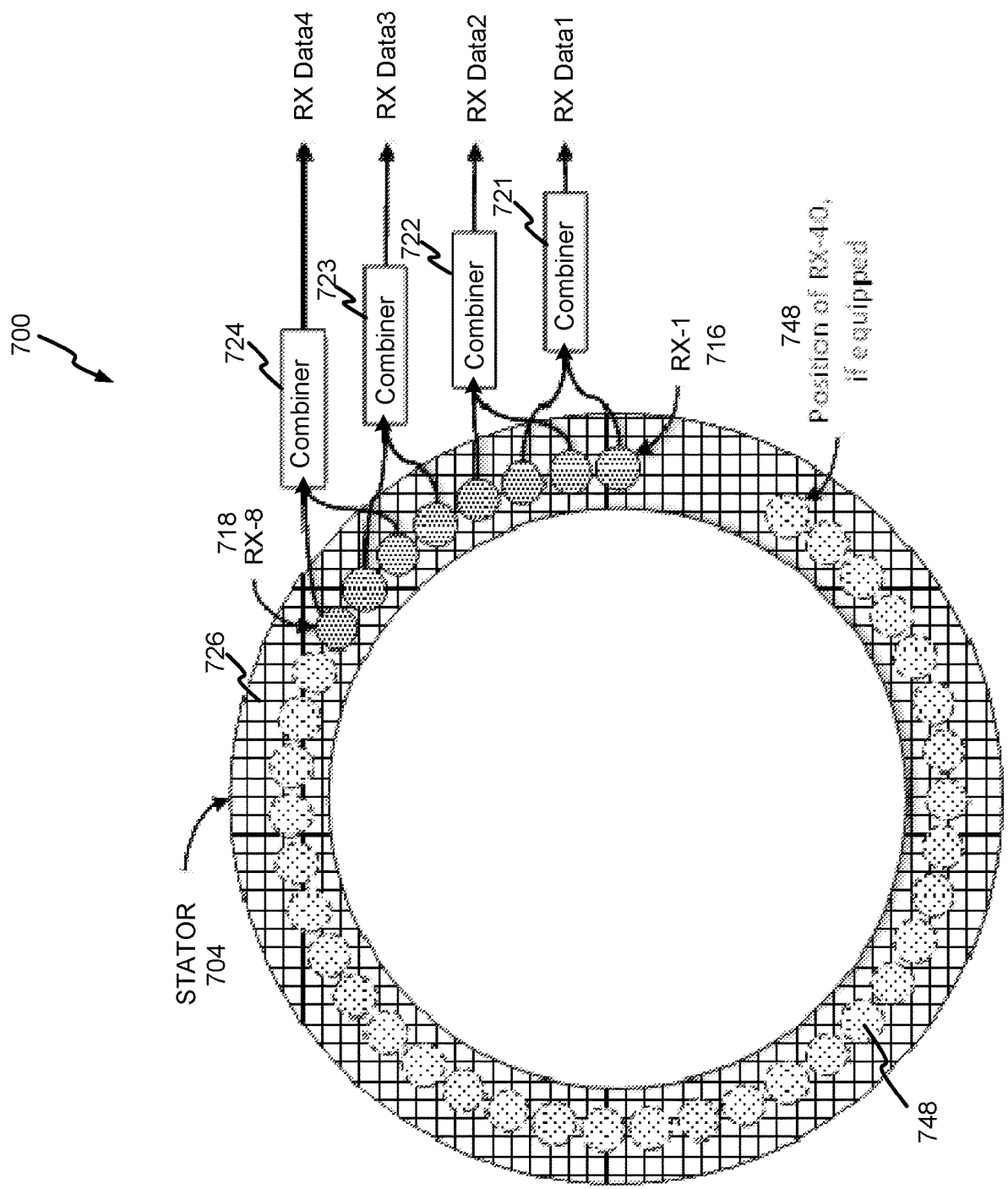
FIG. 7 is a plan view diagram of a stator of an optical rotary joint having eight receiver cells for four wavelength-division multiplexing channels, in accordance with some embodiments.

FIG. 7 provides a plan view diagram of a stator 704 portion of an alternative optical rotary joint 700, equipped in this example to handle four WDM channels. Eight receiver cells 716, 718, or two for each wavelength or channel are used. Each set of two receiver cells 716, 718 is positioned on an emitter face 726 of the stator 704 and is coupled to a respective one of four combiners 721, 722, 723, 724 so that there are four combiner units, one for each channel. The figure illustrates the previously mentioned interleaving concept, in which receiver cells 716, 718 for one WDM channel can be inserted between receiver cells for a different WDM channel. FIG. 7 also indicates the intended positions for an additional 32 receiver cells 748, which could support another 16 WDM channels. The additional 16 combiners are not shown in order to make the first four easier to see. In this manner, up to 20 WDM channels can be supported, for an aggregate capacity of 250 Gbps.

The optical rotary joint 100 illustrated in FIG. 1 was configured with a 16-wide optical splitter at the output of the transmit data source. In order to support 32 transmit beam launchers, a 32-wide optical splitter may be used. For WDM operation, the passive optical splitter 110 of FIG. 1 is replaced by a passive M×N directional optical coupler, with M being the number of inputs and N the number of outputs. In this application, the number of WDM channels is M and the number of transmit beam launchers is N.

Figure 8:
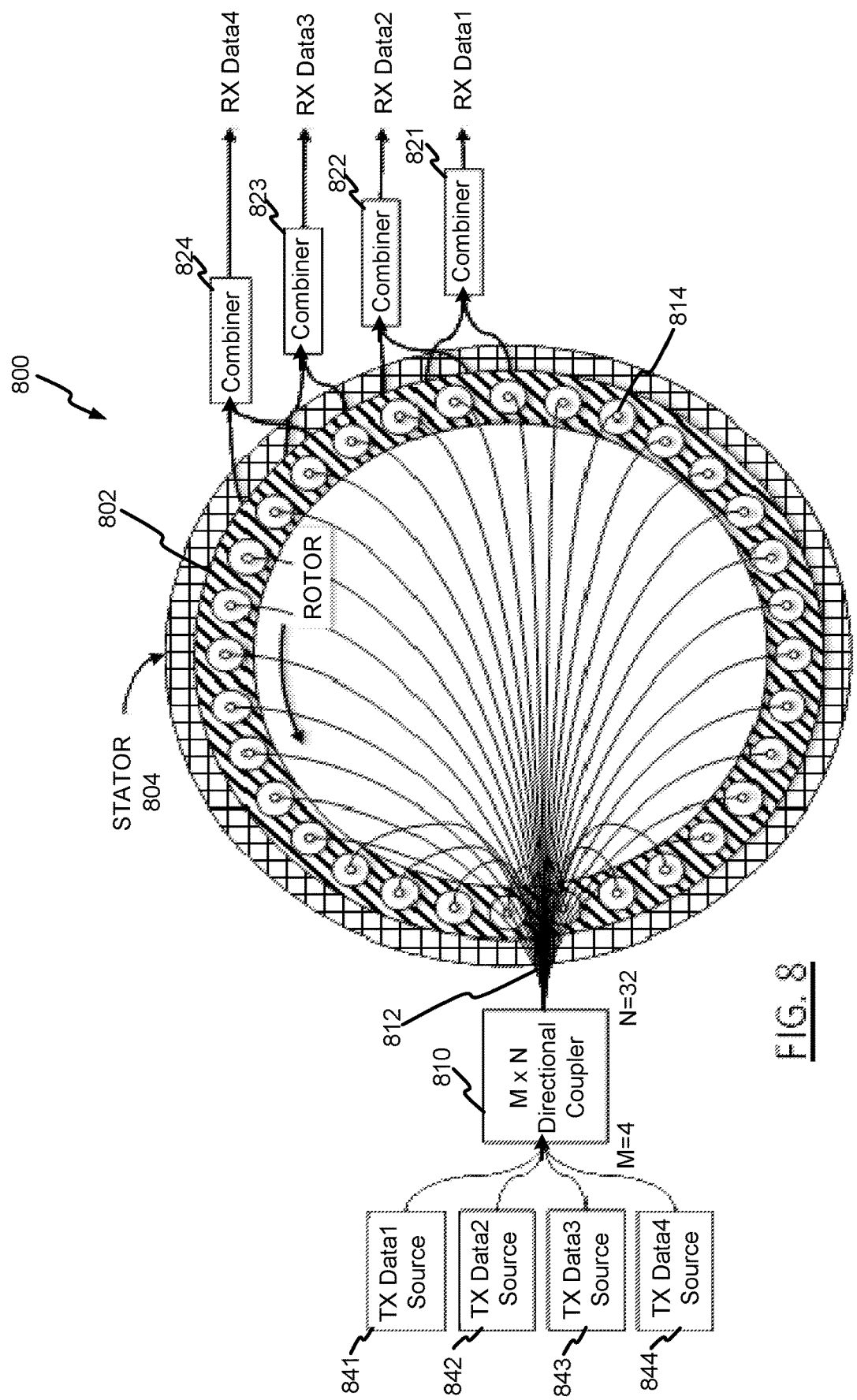
FIG. 8 is a plan view diagram of an optical rotary joint with a rotor and a stator having eight receiver cells for four wavelength-division multiplexing channels in accordance with some embodiments.

FIG. 8 is a plan view diagram of a 4-channel rotor configuration superimposed on the 4-channel stator configuration of FIG. 7. Each of four transmit data sources 841, 842, 843, 844 has a separate and unique wavelength. The four WDM channels from the transmit data sources are connected to the inputs of a passive 4×32 directional coupler 810. The directional coupler 810 splits the optical power in such a way that 1/32 of the power from each input is applied to each of the 32 outputs. Each output is coupled to one end of one of 32 optical fibers 812. The other ends of each output optical fiber are each coupled to one of 32 transmit beam launchers 814. The connection may be independent of wavelength. In this manner, the 32 output fibers 812 and transmit beam launchers 814, are simultaneously carrying all four wavelengths.

Each receiver cell pair (not shown) includes an optical bandpass filter that matches the desired transmit wavelength. As the rotor revolves, only the designated receiver cell pair responds to and outputs the intended data signal. The output of each pair is coupled to a respective combiner 821, 822, 823, 824 that combines the output of each pair, resulting in four combiner outputs, one corresponding to each transmit data source 841, 842, 843, 844. As a result, each channel is processed independently by the optical rotary joint 800. There is no need to coordinate clock timing or other signal characteristics among the multiplexed channels. Any WDM channel can be added or removed without affecting the operation of the other channels.

An advantageous characteristic of M×N directional couplers is that the branching-ratio loss remains constant as long as M≤N. This implies that a 2×32 directional coupler, or a 4×32 coupler, or even a 20×32 coupler, all have a theoretical branching loss of 15 dB, from any input to any output. The practical benefit of this characteristic is that the M×32 directional coupler and the 32 associated transmit beam launchers are, in effect, common infrastructure for an optical rotary joint that can be outfitted on an incremental basis, with the number of independent WDM channels ranging from one to M. This incremental aspect would enable cost savings in a manufacturing situation, in that the cost of the manufactured product would be largely proportional to the aggregate data capacity: transmit data sources and receiver cells may be installed only as needed to support the required data capacity.

As described herein high data rate signals are possible across the rotating interface of an emitter face and a receiver face between a rotor and a stator of a large-diameter optical rotary joint. The invention is suitable for open-axis operation, meaning that the rotational axis and central area of the optical rotary joint are available for other purposes, and are thus not obstructed by the invention embodiment.

The input signals to the optical rotary joint may be formatted as two-level, intensity-modulated optical waveforms using readily available techniques and components for signals at data rates of 12.5 Gbps and below. Such signal may have any of a variety of different frame formats, coding and modulation formats and still provide bit rates up to 12.5 Gbps. Further, individual WDM channels may each have different rates and formats, with no need for accommodation or coordination among channels.

Described embodiments transmit optical data signals across the rotating interface in a direction parallel or substantially parallel to the rotational axis. This provides for direct transmission into receivers without requiring any reflectors. The described free-space optical path uses lens elements instead of reflectors. The lens elements may be low-cost molded glass lenses, such as lenses. Selection of the lens and the optical fiber lengths allows the time delay variation from the transmit data source to the combiner to be kept to a very low amount, such as less than one picosecond. In this way the optical delay through the rotating interface is essentially constant regardless of the rotation angle between the rotor and stator, enabling high data rates to be accommodated without deleterious jitter being added. This very low time delay variation is partially the result of determining the optical path length for paraxial propagation through the receiver cells. A variation in optical delay through the free-space optical path of less than one picosecond enables serial data rates of at least 12.5 Gbps.

In described embodiments, the optical performance is tolerant of physical variations in the position of the emitter face and receiver face. Axial separation and axial misalignment on the order of several millimeters introduces only a minimal loss of performance. The transmitted data signals also maintain continuity regardless of the rotation angle between the rotor and stator even as optical sources and receivers switch in and out of operation. High data rates are obtained without the additional cost of an error-correcting code, nor other control overhead such as multiplexing, demultiplexing, framing, etc.

Described embodiments also do not require any synchronization of optical source or receiver switching nor any synchronization or coordination with the rotation angle of the rotary joint. The switching function between receivers may be performed autonomously using only signal level information derived from the electrical outputs of the optical receivers.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provide an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, thermal noise, angles, coaxialism and/or parallelism. Such relativity between items ranges from a difference of a few percent to magnitude differences.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition, or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for.

The invention claimed is:

1. An optical rotary joint comprising:
a first annular portion having a receiver face substantially orthogonal to a rotational axis of the rotary joint;
a second annular portion configured to rotate with respect to the first annular portion about the rotational axis, the second annular portion having an emitter face substantially orthogonal to the rotational axis and facing the receiver face;
a plurality of optical receivers on the receiver face facing the emitter face; and
a plurality of optical transmit beam launchers on the emitter face configured to transmit optical signals to the optical receivers as the second annular portion rotates with respect to the first annular portion;
wherein the plurality of optical transmit beam launchers are configured to transmit optical signals at two different wavelengths; and wherein the plurality of optical receivers further comprise one of two different optical bandpass filters to pass a respective one of the two different wavelengths.

2. The optical rotary joint of claim 1, wherein the first second annular portion is a rotating portion and comprises a transmit data source, an optical splitter coupled to the transmit data source, and a plurality of optical fibers each coupled to one of the plurality of optical transmit beam launchers at one end and the optical splitter at an opposite end.

3. The optical rotary joint of claim 2, wherein the transmit data source, the optical splitter and the plurality of optical fibers are all mounted to a supporting structure of the second annular portion.

4. The optical rotary joint of claim 2, wherein
the optical splitter comprises an optical device that splits the optical signal from the transmit data source into essentially identical replicas for each of the plurality of optical fibers,
the plurality of optical fibers are of nominally equal length, and
the transmit beam launchers comprises a collimator coupled to the respective optical fiber, wherein the collimator is directed to the receiver face.

5. The optical rotary joint of claim 1, wherein the optical receivers comprise a photodetector and a lens configured to direct a received optical signal to the photodetector and wherein the lens is configured to provide no more than a predetermined time delay variation in optical path length for axial and paraxial optical signals.

6. The optical rotary joint of claim 5, wherein the predetermined time delay variation is less than one picosecond.

7. The optical rotary joint of claim 5, wherein the lens consists of a single aspheric element.

8. The optical rotary joint of claim 1, further comprising a transmit data source for the optical signals at two different wavelengths, an optical splitter coupled to the transmit data source, and a plurality of optical fibers each coupled to one of the plurality of optical transmit beam launchers at one end and the optical splitter at an opposite end.

9. The optical rotary joint of claim 1, wherein the plurality of optical transmit beam launchers are positioned equiangularly spaced around the emitter face.

10. The optical rotary joint of claim 9, wherein the optical receivers are positioned on the receiver face with an angular separation of at least 3/2 times the angular separation of the optical transmit beam launchers.

11. The optical rotary joint of claim 1, wherein the optical receivers convert respective received optical signals to respective electrical signals, the optical rotary joint further comprising a combiner coupled to the optical receivers to receive the electrical signals and combine them to form a single received electrical signal.

12. The optical rotary joint of claim 1, wherein the transmit beam launchers and the optical receiver are positioned on the emitter face and the receiver face, respectively, so that at least one of the plurality of optical receivers is always receiving an optical signal from at least one of the plurality of transmit beam launchers while the second annular portion rotates with respect to the first annular portion.

13. The optical rotary joint of claim 1, wherein the transmit beam launchers and the optical receiver are positioned on the emitter face and the receiver face, respectively, so that no optical receivers is receiving an optical signal from two different transmit beam launchers at the same time while the second annular portion rotates with respect to the first annular portion.

14. The optical rotary joint of claim 1, wherein the transmit beam launchers and the optical receiver are positioned on the emitter face and the receiver face, respectively, so that two different optical receivers receive a same optical signal from two different transmit beam launchers respectively at the same time while the second annular portion rotates with respect to the first annular portion.

15. The optical rotary joint of claim 1, wherein the transmit beam launchers are positioned over only a portion of the emitter face such that no optical receiver is receiving an optical signal during a portion of the rotation of the second annular portion with respect to the first annular portion and wherein the transmit data source provides transmit data bursts only during the time that the optical signal will be received by an optical receiver.

16. An optical data transmission interface in a rotary joint having a rotational axis comprising:
a first portion of the rotary joint;
a plurality of transmit beam launchers positioned on the first portion and configured to transmit optical beams parallel to the rotation axis;
a second portion of the rotary joint; and
a plurality of optical receivers positioned on the second portion and configured to receive the optical beams from the transmit beam launchers;
wherein the plurality of transmit beam launchers are configured to transmit optical signals at two different wavelengths; and
wherein the plurality of optical receivers further comprise one of two different optical bandpass filters to pass a respective one of the two different wavelengths.

17. The optical data transmission interface of claim 16, wherein the first portion and the second portion rotate with respect to each other.

18. The optical data transmission interface of claim 16, wherein the plurality of transmit beam launchers transmit the same optical beam and wherein the optical receivers are positioned to receive the optical beam as the first portion and the second portion rotate with respect to each other.

19. An optical rotary joint comprising:
a first annular portion having a first face substantially orthogonal to a rotational axis of the rotary joint;
a second annular portion configured to rotate with respect to the first annular portion about the rotational axis, the second annular portion having a second face substantially orthogonal to the rotational axis and facing the first face;
a plurality of optical receivers on the first face facing the second face;
a plurality of optical receivers on the second face facing the first face;
a plurality of optical transmit beam launchers on the first face configured to transmit optical signals to the optical receivers on the second face as the second annular portion rotates with respect to the first annular portion; and
a plurality of optical transmit beam launchers on the second face configured to transmit optical signals to the optical receivers on the first face as the second annular portion rotates with respect to the first annular portion;
wherein the plurality of optical transmit beam launchers are configured to transmit optical signals at two different wavelengths; and
wherein the plurality of optical receivers further comprise one of two different optical bandpass filters to pass a respective one of the two different wavelengths.

* * * * *